US012534853B2

(12) United States Patent
Liao et al.

(10) Patent No.: US 12,534,853 B2
(45) Date of Patent: Jan. 27, 2026

(54) TWISTED PAIR ORGANIZING TOOL

(71) Applicant: Hanlong Industrial Co., Ltd., New Taipei (TW)

(72) Inventors: Chien-Chou Liao, New Taipei (TW); Mei-Fang Lin, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 254 days.

(21) Appl. No.: 17/984,391

(22) Filed: Nov. 10, 2022

(65) Prior Publication Data

US 2024/0018716 A1    Jan. 18, 2024

(30) Foreign Application Priority Data

Jul. 15, 2022 (TW) ................................. 111207666

(51) Int. Cl.
*B21F 15/02* (2006.01)
*B21F 1/02* (2006.01)
*B25B 25/00* (2006.01)
*D07B 7/18* (2006.01)
*H02G 1/00* (2006.01)

(52) U.S. Cl.
CPC .................. *D07B 7/18* (2013.01); *B21F 1/02* (2013.01); *B21F 15/02* (2013.01); *B25B 25/00* (2013.01); *H02G 1/00* (2013.01)

(58) Field of Classification Search
CPC ........... D07B 7/18; H02G 1/1292; B21F 7/00; B21F 15/02; B21F 72/149; B21F 15/04
USPC ......................................... 140/118, 120, 123
See application file for complete search history.

(56) References Cited

U.S. PATENT DOCUMENTS

| 7,350,393 | B2 * | 4/2008 | Li | ............................. B25B 7/04 |
| | | | | 72/482.91 |
| 8,429,948 | B1 * | 4/2013 | Warren | ..................... B25B 7/02 |
| | | | | 72/409.13 |

* cited by examiner

*Primary Examiner* — Debra M Sullivan
(74) *Attorney, Agent, or Firm* — Best & Flanagan LLP (57) ABSTRACT

A twisted pair organizing tool is disclosed. The twisted pair organizing tool includes a body, a first and a second hole. The first and the second hole can be pressed so as to change the inner diameters thereof. When a first and a second cable are in a twisted state, the body is rotated in reverse to untwist and cause the first and a second cable to enter the first and the second hole, respectively. Once the first and the second cable have entered the first and the second hole by a predetermined length, a first end of the body is pressed such that the first and the second hole are tightly combined with the first and the second cable, and the first and the second cable are pulled out such that the first and the second cable are straightened.

7 Claims, 10 Drawing Sheets

TWISTED PAIR ORGANIZING TOOL

BACKGROUND OF THE INVENTION

1. Field of the Invention

The present application relates to a twisted pair organizing tool, and more particularly, to a twisted pair organizing tool capable of readily untwisting twisted cables.

2. Description of the Related Art

A twisted pair is a type of spiral-looking cable formed by twisting and intertwining two mutually insulated cables covered by an insulating material such as plastic on the outside and containing copper cables on the inside. The twisted pair is capable of reducing attenuation, crosstalk and noise in signals during transmission, as well as improving the suppression of external electromagnetic interference. However, the twisted cables of the twisted pair first need to be untwisted in order to be connected to a connector. This process is performed at the cost of many procedures and causes complications to engineering staff.

Therefore, there is a need for a novel twisted pair organizing tool to solve the drawbacks of the prior art.

SUMMARY OF THE INVENTION

It is the primary object of the present application to provide a twisted pair organizing tool capable of readily untwisting twisted cables.

To achieve the above object, a twisted pair organizing tool of the present application is adapted to untwist a first cable and a second cable that are twisted together. The twisted pair organizing tool includes a body, a first hole and a second hole. The body has a first end and a second end. The first hole is located at the first end. The second hole is located at the first end and is adjacent to the first hole. The first assembly member and the second assembly member can be pressed to change the inner diameters of the first hole and the second hole. When the first cable and a second cable are in a twisted state, the body is rotated in reverse to untwist and cause the first cable and a second cable to enter the first hole and the second hole, respectively. Once the first cable and the second cable have entered the first hole and the second hole by a predetermined length, the first end of the body is pressed such that the first hole and the second hole are combined tightly with the first cable and the second cable, and the first cable and the second cable are pulled out such that the first cable and the second cable are straightened.

DETAILED DESCRIPTION OF THE PREFERRED EMBODIMENTS

The advantages and innovative features of the invention will become more apparent from the following detailed descriptions when taken in conjunction with the accompanying drawings.

Figure 1:
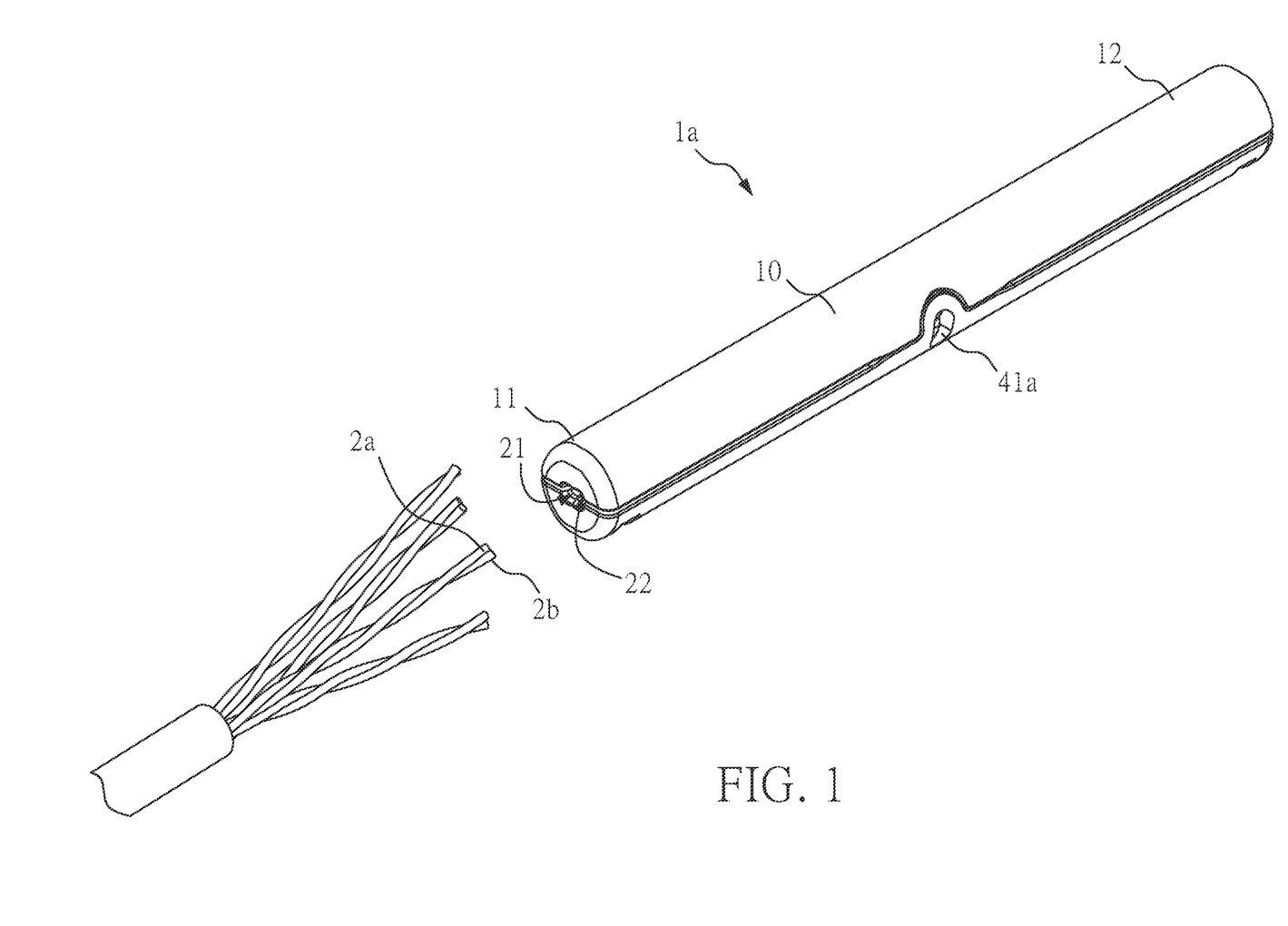
FIG. 1 is a schematic diagram of a twisted pair organizing tool according to a first embodiment of the present application.
Figure 1A:
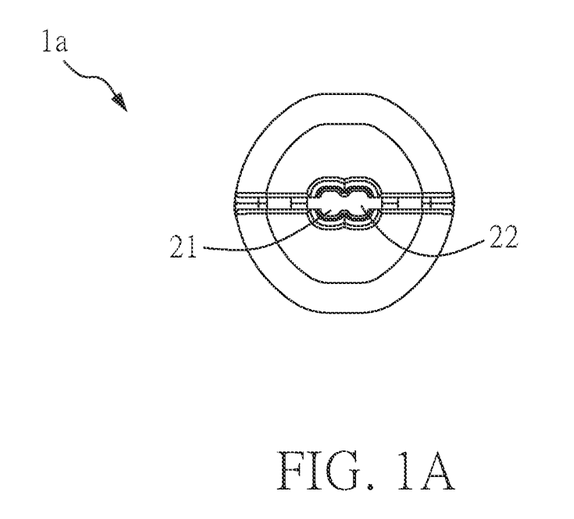
FIG. 1A is a side view from a first side of a twisted pair organizing tool according to the first embodiment of the present application.

Refer to FIG. 1, which shows a schematic diagram of a twisted pair organizing tool according to a first embodiment of the present application; FIG. 1A, which shows a side view from a first side of a twisted pair organizing tool according to the first embodiment of the present application; and FIG. 1B, which shows a side view from a second side of a twisted pair organizing tool according to the first embodiment of the present application.

Figure 1B:
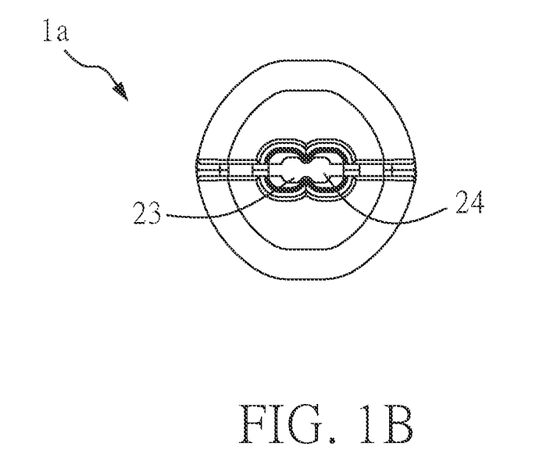
FIG. 1B is a side view from a second side of a twisted pair organizing tool according to the first embodiment of the present application.

In the first embodiment of the present application, a twisted pair organizing tool 1a is used to untwist a first cable 2a and a second cable 2b twisted together. It should be noted that, although the terms "first" and "second" are used to describe various components of the present application, these terms are not to be construed as limitations to the elements. Such terms are merely for differentiating one component from another component. For example, without departing from the scope of the various embodiments described, a first hole may be referred to as a second hole, and similarly, a second hole may be referred to as a first hole. The first hole and the second hole are both holes but are not the same hole.

In one embodiment of the present application, the twisted pair organizing tool 1a includes a body 10, a first hole 21, a second hole 22, a third hole 23 and a fourth hole 24. The body 10 has a first end 11 and a second end 12. The first hole 21 and the second hole 22 are located at the first end 11, and the third hole 23 and the fourth hole 24 are located at the first end 12. In the first embodiment of the present application, the aperture diameters of the first hole 21 and the second hole 22 are smaller than the aperture diameters of the third hole 23 and the fourth hole 24; however, the present application is not limited to the examples above, and the aperture diameters of the holes may be equal.

Figure 2:
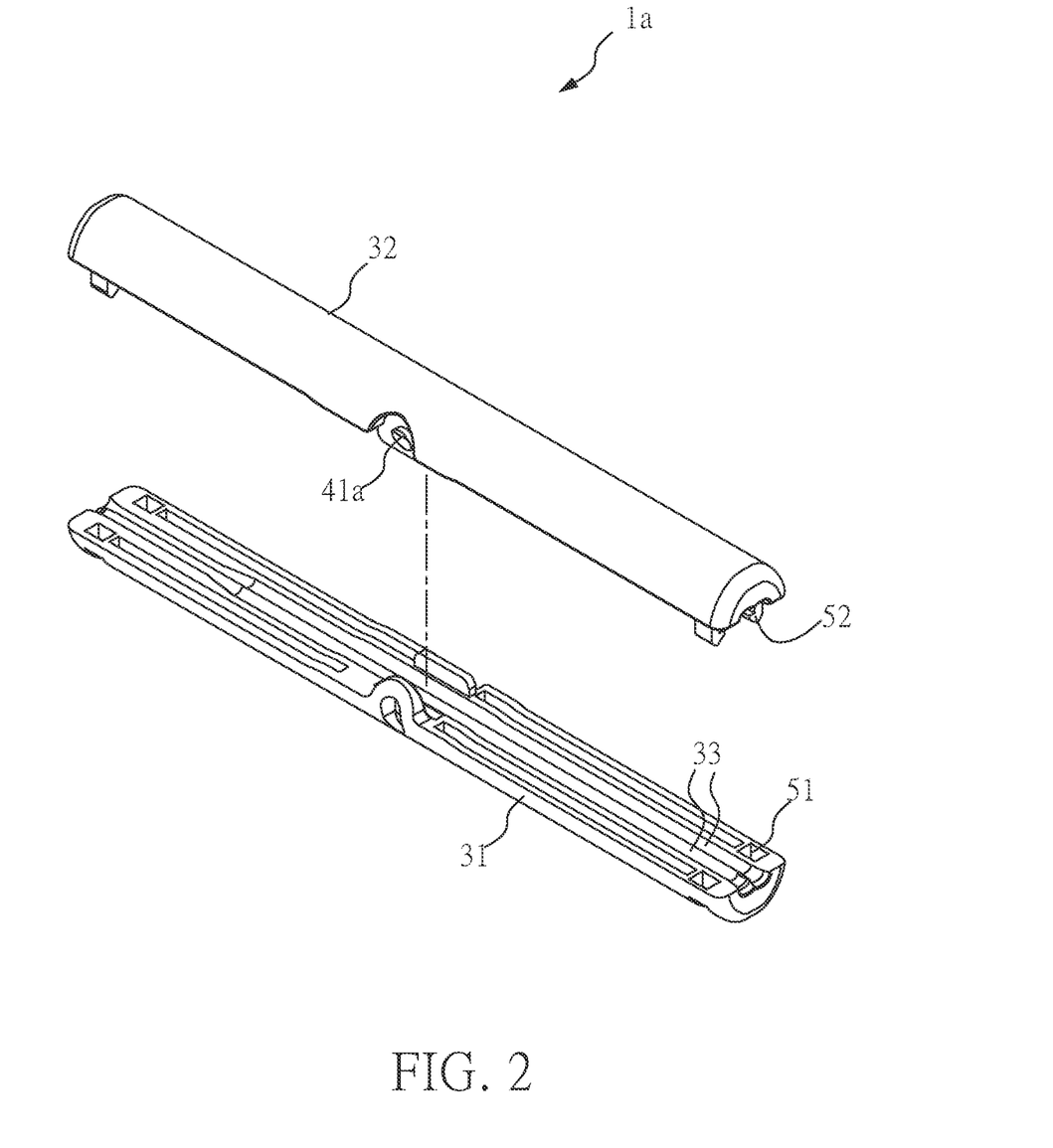
FIG. 2 is an exploded schematic diagram of a twisted pair Organizing tool according to the first embodiment of the present application.

Refer to FIG. 2, which shows an exploded schematic diagram of a twisted pair organizing tool according to the first embodiment of the present application.

In the first embodiment of the present application, the body 10 may be divided into a first assembly member 31 and a second assembly member 32. The first assembly member 31 and the second assembly member 32 are long strips having grooves 33 at both ends, so as to be assembled together to form the first hole 21, the second hole 22, the third hole 23 and the fourth hole 24. The first hole 21 and the second hole 22 are adjacent, and the third hole 23 and the fourth hole 24 are adjacent. The grooves 33 may extend from top ends of the first assembly member 31 and the second assembly member 32 to centers of the first assembly member 31 and the second assembly member 32. The present application does not specifically define widths, lengths or numbers of the grooves 33. The twisted pair organizing tool 1a further includes a connecting structure 41a located at the center of the body 10. The first assembly member 31 and the second assembly member 32 can be engaged or fitted with each other by the connecting structure 41a at the center, and gaps are present at both ends of the first assembly member 31 and the second assembly member 32. Thus, minute turning or swaying between the first assembly member 31 and the second assembly member 32 is permitted so as to reduce the gaps at the two ends.

Figure 3:
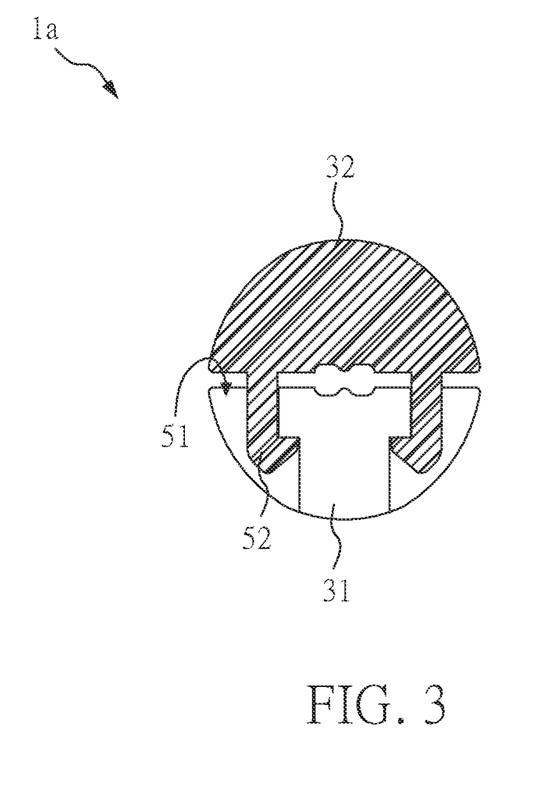
FIG. 3 is a section view from a first side of a twisted pair organizing tool according to the first embodiment of the present application.

Refer to FIG. 3, which shows a section Tiew from a first side of a twisted pair organizing tool according to the first embodiment of the present application.

Each of the first end 11 and the second end 12 of the body 10 has a limiting structure. In the first end 11 of the body 10, for example, the first assembly member 31 further includes a recessed fitting portion 51 close to the first end 11, and the second assembly member 32 further includes a protruding fitting member 52. The fitting portion 51 and the fitting member 52 match each other such that the fitting member 52 can be fitted into the fitting portion 51, thereby limiting an open range of the first assembly member 31 and the second assembly member 32 at the first end 11. The second end 12 of the body 10 may also have the same structure or a different structure.

Refer to FIGS. 4A to 4D, which show schematic diagrams of continuous actions of a twisted pair organizing tool according to the first embodiment of the present application.

Figure 4A:
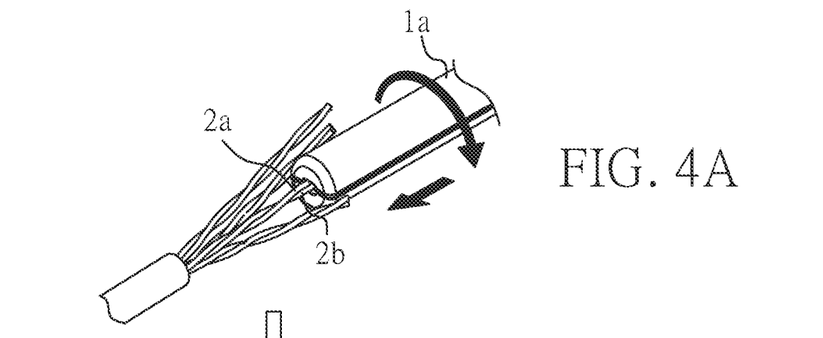
FIGS. 4A to 4D are schematic diagrams of continuous actions of a twisted pair organizing tool according to the first embodiment of the present application.
Figure 4B:
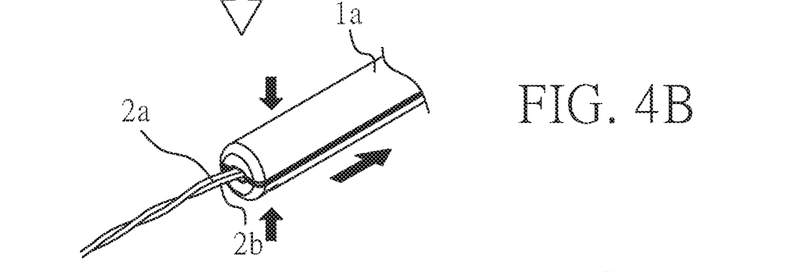
Figures 4C, 4D:
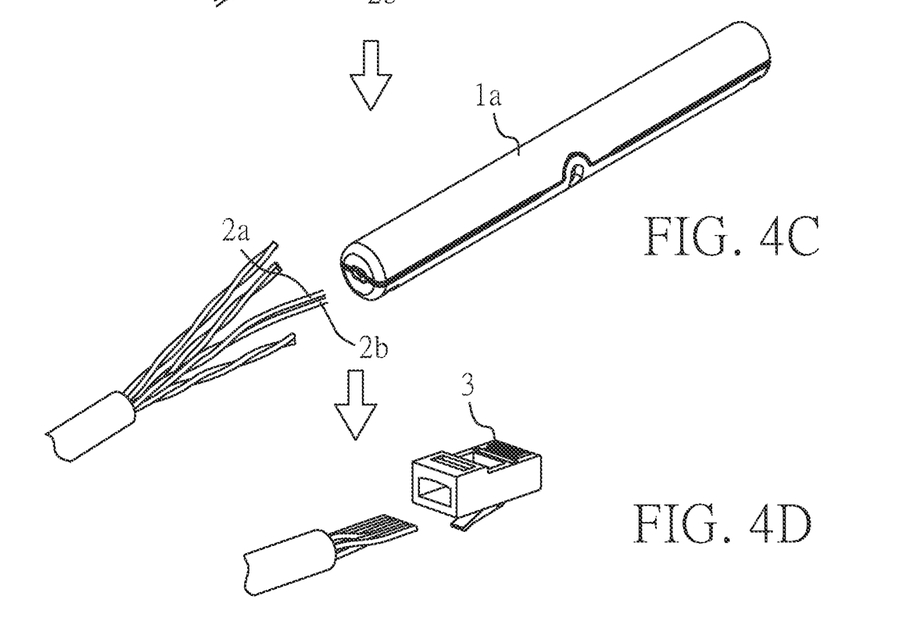

It is known from the description above that minute turning or swaying is permitted between the first assembly member 31 and the second assembly member 32, and the aperture diameter of the first hole 21, the second hole 22, the third hole 23 or the fourth hole 24 can be reduced when the gaps at both ends of the first assembly member 31 and the second assembly member 32 are reduced. Thus, when the first cable 2a and the second cable 2b are in a twisted state, the body 10 is rotated in the reverse direction of the twisting direction of the cables such that the first cable 2a and the second cable 2b can be placed into the first hole 21 and the second hole 22 (as shown in FIG. 4A) By this action, the first cable 2a and the second cable 2b are untwisted and respectively enter the first hole 21 and the second hole 22. Once the first cable 2a and the second cable 2b have entered the first hole 21 and the second hole 22 by a predetermined length, the first end 11 of the body 10 is pressed to reduce the gap between the first assembly member 31 and the second assembly member 32 at the first end 11 (as shown in FIG. 4B) That is, the aperture diameters of the first hole 21 and the second hole 22 are reduced, and the first hole 21 and the second hole 22 become tightly combined with the first cable 2a and the second cable 2b. The predetermined length above may be adjusted according to the length of the groove 33. Then the first cable 2a and the second cable 2b (as shown in FIG. 4C) are pulled away from the twisted pair organizing tool 1a such that the first cable 2a and the second cable 2b are straightened to facilitate subsequent processing. Finally, the first cable 2a and the second cable 2b can be connected to another connection port 3 (as shown in FIG. 4D).

Figure 5A:
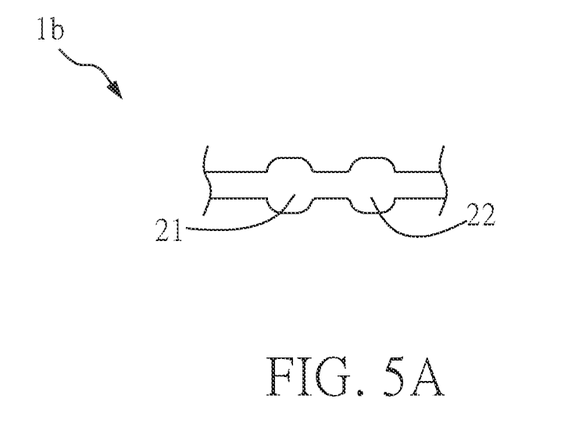
FIG. 5A is a side view from a first side of a twisted pair organizing tool according to a second embodiment of the present application.
Figure 5B:
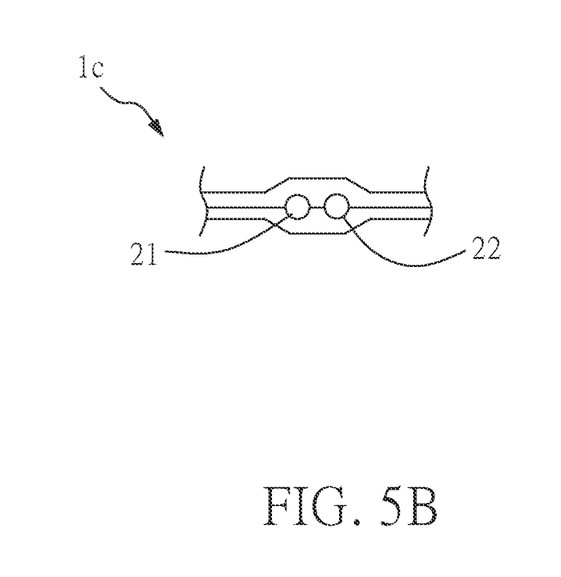
FIG. 5B is a side view from a first side of a twisted pair organizing tool according to a third embodiment of the present application.

Refer to FIG. 5A, which shows a side view from a first side of a twisted pair organizing tool according to a second embodiment of the present application, and FIG. 5B, which shows a side view from a first side of a twisted pair organizing tool according to a third embodiment of the present application.

In the second embodiment of the present application, the first hole 21 and the second hole 22 of a twisted pair organizing tool 1b are not connected but are spaced by a predetermined distance, wherein the predetermined distance is not specifically defined by the present application. Alternatively, in the third embodiment of the present application, the shape formed by the first assembly member 31 and the second assembly member 32 of a twisted pair organizing tool 1c at an enclosing portion at the first end 11 is similar to a hexagon. However, the interior at the enclosing portion is still divided into the first hole 21 and the second hole 22 for placement of the first cable 2a and the second cable 2b.

Figure 6A:
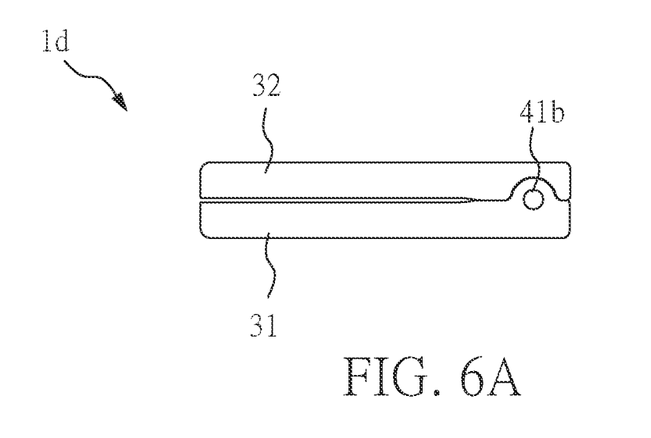
FIG. 6A is a schematic diagram of a twisted pair organizing tool according to a fourth embodiment of the present application.

Refer to FIG. 6A, which shows a schematic diagram of a twisted pair organizing tool according to a fourth embodiment of the present application.

In the fourth embodiment of the present application, a connecting structure 41b of a twisted pair organizing tool 1d is located close to the second end 12 of the body 10 so as to combine in an engaged or fitted manner the first assembly member 31 and the second assembly member 32.

Figure 6B:
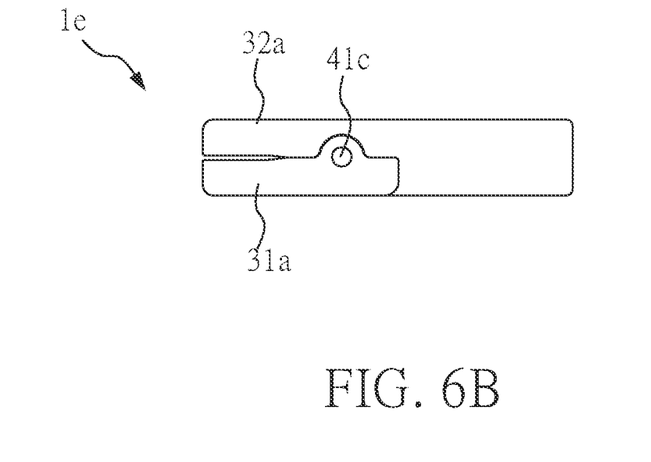
FIG. 6B is a schematic diagram of a twisted pair organizing tool according to a fifth embodiment of the present application.

Refer to FIG. 6B, which shows a schematic diagram of a twisted pair organizing tool according to a fifth embodiment of the present application.

In the fifth embodiment of the present application, shapes and lengths of a first assembly member 31a and a second assembly member 32a of a twisted pair organizing tool 1e are different. The second assembly member 32a is longer than the first assembly member 31a, and an end of the first assembly member 31a is connected to the second assembly member 32a by a connecting structure 41c.

Figure 6C:
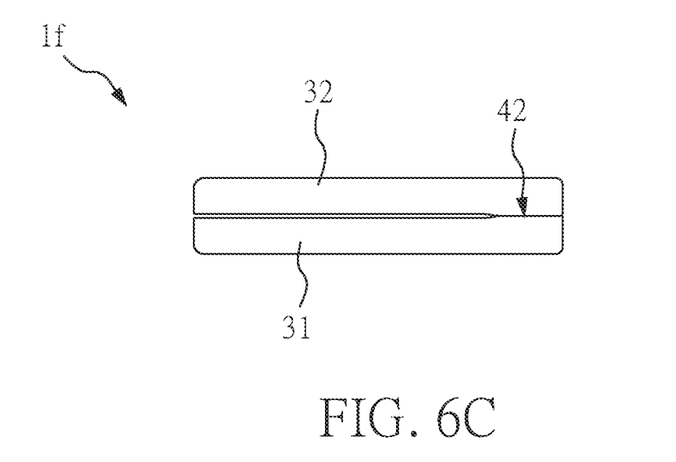
FIG. 6C is a schematic diagram of a twisted pair organizing tool according to a sixth embodiment of the present application.

Refer to FIG. 6C, which shows a schematic diagram of a twisted pair organizing tool according to a sixth embodiment of the present application.

In the sixth embodiment of the present application, the first assembly member 31 and the second assembly member 32 of a twisted pair organizing tool 1f are directly adhered to an adhesion portion 42. The adhesion portion 42 may be close to the second end 12.

Figure 6D:
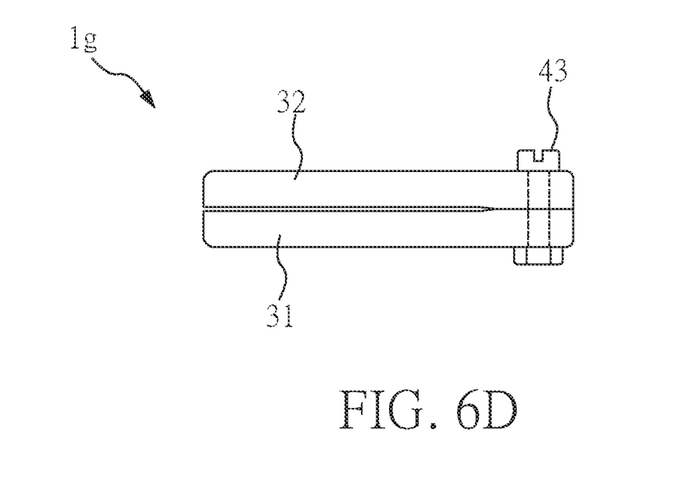
FIG. 6D is a schematic diagram of a twisted pair organizing tool according to a seventh embodiment of the present application.

Refer to FIG. 6D, which shows a schematic diagram of a twisted pair organizing tool according to a seventh embodiment of the present application.

In the seventh embodiment of the present application, the first assembly member 31 and the second assembly member 32 of a twisted pair organizing tool 1g are passed through and fixed by a fixing member 43, and the position of the fixing member 43 may be close to the second end 12.

Figure 7:
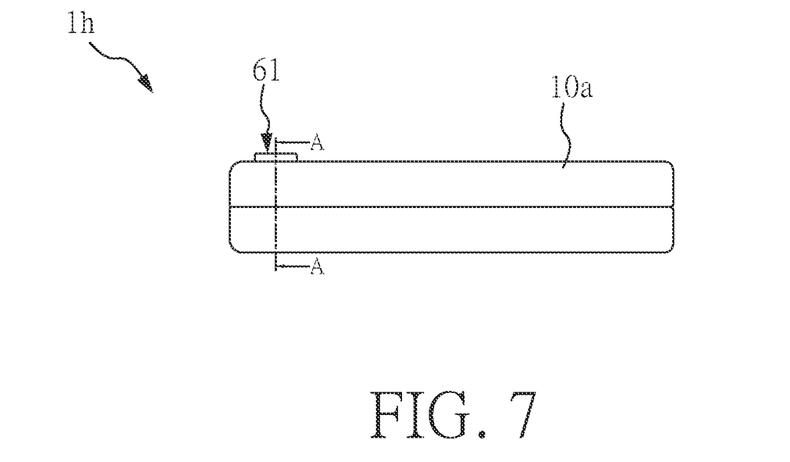
FIG. 7 is a schematic diagram of a twisted pair organizing tool according to an eighth embodiment of the present application.
Figure 7A:
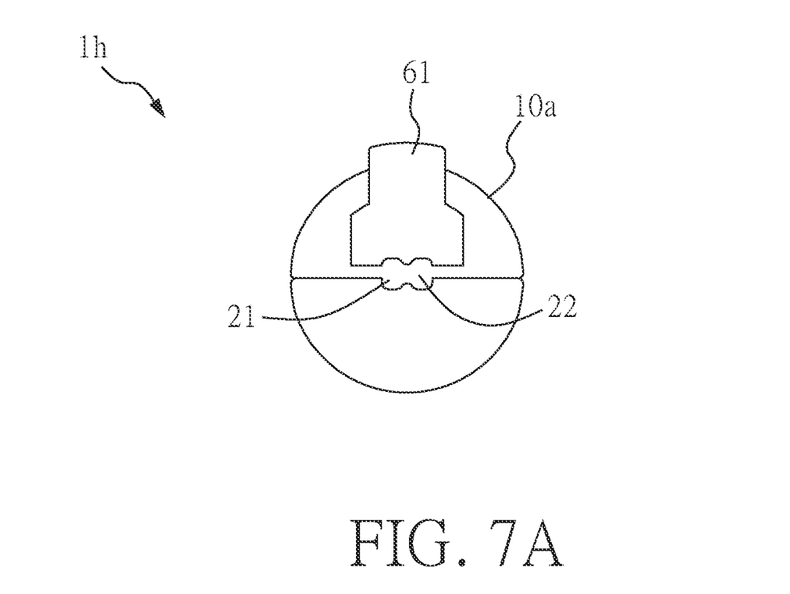
FIG. 7A is a section view of a twisted pair organizing tool along the line A-A in FIG. 7 according to the eighth embodiment of the present application.

Refer to FIG. 7, which shows schematic diagram of an appearance of a twisted pair organizing tool according to an eighth embodiment of the present application, and FIG. 7A, which shows a section view of a twisted pair organizing tool along the line A-A according to the eighth embodiment of the present application.

In the eighth embodiment of the present application, a twisted pair organizing tool 1h further includes a press member 61, which passes through the first end 11 of a body 10a. The main body 10a may not be divided into the first assembly member 31 and the second assembly member 32. A bottom portion of the press member 61 can adapt to the shape of an interior of the body 10a so as to form the first hole 21 and the second hole 22. Thus, when the press member 61 is pressed, the first hole 21 and the second hole 22 are closed to become tightly combined with the first cable 2a and the second cable 2b.

Figure 8:
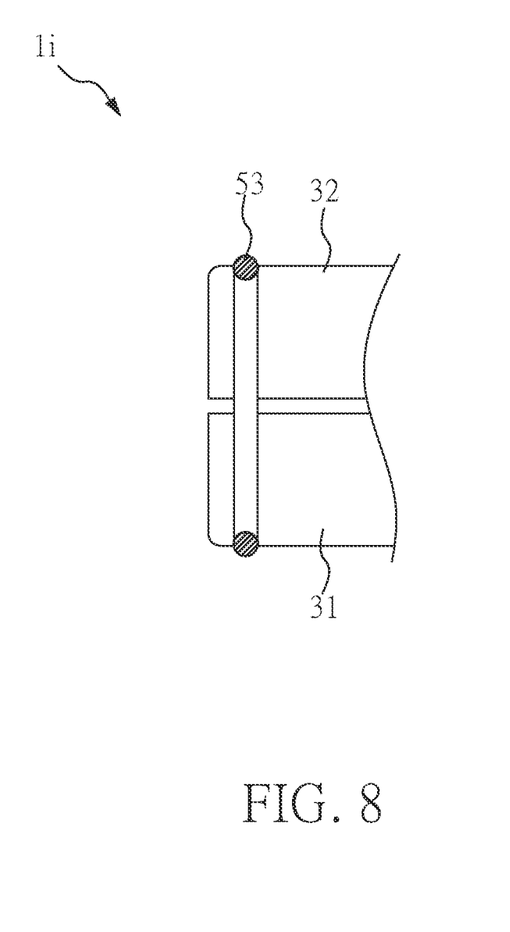
FIG. 8 is a partial schematic diagram of an appearance of a twisted pair organizing tool according to a ninth embodiment of the present application.

Refer to FIG. 8, which shows a partial schematic diagram of an appearance of a twisted pair organizing tool according to a ninth embodiment of the present application.

In the ninth embodiment of the present application, the limiting structure of a twisted pair organizing tool 1i may be a fastening ring 53. The fastening ring 53 is for encircling and fixing the first assembly member 31 and the second assembly member 32. The fastening ring 53 provides a function similar to those of the fitting recess 51 and the fitting member 52 in that it limits an open range of the first assembly member 31 and the second member 32.

In addition to the mechanisms and components described above, the twisted pair organizing tools 1a, 1b, 1c, 1d, 1e, 1f, 1g, 1h and 1i of the present application may further include other mechanisms and components. These other mechanisms and components are not the focus of the present application and are therefore not further described herein for brevity. It should be noted that the present application is not limited to the implementation forms of the twisted pair organizing tools 1a, 1b, 1c, d, 1e, 1f, 1g, 1h and 1i above.

It is known from the description above that the twisted pair organizing tools 1a, 1b, 1c, 1d, 1e, 1f, 1g, 1h and 1i of the present application are capable of readily straightening the twisted first cable 2a and second cable 2b, hence effectively eliminating the drawbacks of the prior art.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A twisted pair organizing tool, adapted to untwist a first cable and a second cable twisted together, the twisted pair organizing tool comprising:
a tubular body, having a first assembly member, a second assembly member, a first end and a second end;
a first hole, located at the first end;
a second hole, located at the first end and adjacent to the first hole;
a third hold, located at the second end; and
a fourth hole, located at the second end and adjacent to the third hold; wherein the first assembly member and the second assembly member having grooves are matched and assembled with each other by a connecting structure to form the first hole, the second hole, the third hole, and the fourth hole; wherein the grooves extend from top ends of the first assembly and the second assembly member to centers of the first assembly member and the second assembly member;
wherein the aperture diameters of the first hole, the second hole, the third hole, and the fourth hole can be changed by pressing the first end or the second end of the body; when the first cable and the second cable are in a twisted state, the body is rotated in reverse to untwist and cause the first cable and the second cable to enter any two adjacent holes selected from the first hole, the second hole, the third hole and the fourth hole, respectively; once the first cable and the second cable have entered any two adjacent holes selected from the first hole, the second hole, the third shole, and the fourth hole by a predetermined length, the first end or the second end of the body is pressed such that the first assembly member and the second assembly member are combined tightly with the first cable and the second cable, and the first cable and the second cable are pulled out such that the first cable and the second cable are straightened.

2. The twisted pair organizing tool as claimed in claim 1, wherein the connecting structure is located at a center of the body to connect the first assembly member and the second assembly member.

3. The twisted pair organizing tool as claimed in claim 1, wherein the connecting structure is located close to the second end of the body to connect the first assembly member and the second assembly member.

4. The twisted pair organizing tool as claimed in claim 1, wherein a length of the second assembly member is greater than a length of the first assembly member such that the connecting structure is located at an end of the first assembly member for connecting to the second assembly member.

5. The twisted pair organizing tool as claimed in claim 1, wherein the first assembly member further comprises a fitting portion and the second assembly member further comprises a fitting member, and the fitting member and the fitting portion match each other to limit an open range of the first assembly member and the second assembly member.

6. The twisted pair organizing tool as claimed in claim 1, wherein the aperture diameters of the first hole and the second hole are smaller than the aperture diameters of the third hole and the fourth hole.

7. The twisted pair organizing tool as claimed in claim 1, wherein the first hole and the second hole are spaced by a predetermined distance.

* * * * *